(12) United States Patent
Kaushik et al.

(10) Patent No.: US 11,429,437 B2
(45) Date of Patent: Aug. 30, 2022

(54) SYSTEM FOR ARBITRATING BETWEEN MULTIPLE FLOWS

(71) Applicant: NXP USA, Inc., Austin, TX (US)

(72) Inventors: Arvind Kaushik, Noida (IN); Puneet Khandelwal, Noida (IN); Pradeep Singh, Noida (IN)

(73) Assignee: NXP USA, Inc., Austin, TX (US)

( * ) Notice: Subject to any disclaimer, the term of this patent is extended or adjusted under 35 U.S.C. 154(b) by 196 days.

(21) Appl. No.: 17/002,192

(22) Filed: Aug. 25, 2020

(65) Prior Publication Data

US 2022/0066815 A1    Mar. 3, 2022

(51) Int. Cl.
*G06F 9/46* (2006.01)
*G06F 9/48* (2006.01)
*G06F 9/50* (2006.01)

(52) U.S. Cl.
CPC .......... *G06F 9/4881* (2013.01); *G06F 9/5038* (2013.01)

(58) Field of Classification Search
CPC .............................. G06F 9/4881; G06F 9/5038
See application file for complete search history.

(56) References Cited

U.S. PATENT DOCUMENTS

| 6,438,135 | B1 | 8/2002 | Tzeng |
| 8,443,118 | B2 | 5/2013 | Go et al. |
| 8,667,200 | B1 | 3/2014 | Muliadi et al. |
| 9,582,440 | B2 | 2/2017 | Gabby et al. |

*Primary Examiner* — Gregory A Kessler

(57) ABSTRACT

An arbitration between a plurality of flows for access to a shared resource is disclosed. The plurality of flows may be associated with a single channel or multiple channels. When the plurality of flows are associated with a single channel, one flow is selected from the plurality of flows for accessing the shared resource based on flow priority levels associated with flows that are currently arbitrating for the access. Flow data associated with the selected flow is then outputted for granting the access. When the plurality of flows are associated with multiple channels, a flow associated with each channel is selected based on the flow priority levels. Further, a channel is selected based on channel priority levels of channels that are currently arbitrating for the access. Based on the selected channel, flow data associated with one of the selected flows is outputted for granting the access to the shared resource.

20 Claims, 2 Drawing Sheets

SYSTEM FOR ARBITRATING BETWEEN MULTIPLE FLOWS

BACKGROUND

The present disclosure relates generally to electronic circuits, and, more particularly, to a system for arbitrating between multiple flows.

An arbitration system (also referred to as an arbiter) is commonly utilized for arbitrating between multiple flows for access to a shared resource. Each flow is a stream of data packets generated by a source node (e.g., a client device) of a network environment. Examples of the arbitration system include a memory arbitration system, a bus arbitration system, or the like. The memory arbitration system arbitrates for access to a memory (i.e., the shared resource) for executing memory access operations, whereas the bus arbitration system arbitrates for access to a data bus (i.e., the shared resource) for executing data transfer operations. To facilitate such an arbitration, the arbitration system includes a storage circuit that stores a priority table. The priority table includes flow data (i.e., identification data) associated with each flow such that each flow data and the corresponding flow have a priority level associated therewith. Based on the priority level of each flow, one of the arbitrating flows is granted access to the shared resource for executing various operations such as the memory access operations, the data transfer operations, or the like.

Typically, the flow having the highest priority level is granted access to the shared resource, and remaining flows (i.e., flows having priority levels less than that of the highest priority flow) are granted access only on the expiry of a weight of the highest priority flow. However, if the highest priority flow is awaiting metadata, the corresponding operation is stalled and the remaining flows are consequently starved access to the shared resource, thereby degrading a performance (i.e., an efficiency) of the arbitration system and a utilization of the shared resource. Further, the flows remain in the priority table for the entirety of the operation of the arbitration system. As a result, latencies are introduced in associated operations, thereby degrading a quality of service of the arbitration system. Additionally, each priority table stores flows associated with a single channel. Typically, flows associated with multiple channels arbitrate for access to the shared resource. Thus, for each channel, the arbitration system includes a corresponding storage circuit (i.e., a corresponding priority table), thereby occupying a significant area. Further, an increase in the number of channels results in an increase in a number of storage circuits (i.e., priority tables) in the arbitration system. This hinders a scalability of the arbitration system. Therefore, there exists a need for a technical solution that solves the aforementioned problems of the existing arbitration systems.

SUMMARY

In one embodiment of the present disclosure, an arbitration system for arbitrating between a plurality of flows for access to a shared resource is disclosed. The arbitration system includes a storage circuit that is configured to store a priority table that includes a plurality of flow data associated with the plurality of flows, respectively, such that each flow data and the corresponding flow have a flow priority level associated therewith. The arbitration system further includes a processing circuit, a selection circuit that is coupled with the processing circuit and the storage circuit, and a flow controller that is coupled with the storage circuit and the selection circuit. The processing circuit is configured to identify, from the plurality of flows, a set of flows that are arbitrating for access to the shared resource, and the selection circuit is configured to select a first flow from the set of flows for accessing the shared resource based on a set of flow priority levels associated with the set of flows, respectively. The flow controller is configured to access the storage circuit to read first flow data associated with the selected first flow, and output the first flow data for granting the first flow access to the shared resource.

In some examples, the processing circuit is further configured to generate, upon identification of the set of flows, an arbitration request indicative of the set of flows. The selection circuit is further configured to receive the arbitration request, and access the storage circuit based on the arbitration request to identify, for selecting the first flow, the set of flow priority levels associated with the set of flows, respectively. The selection circuit is further configured to generate select data that is indicative of the selected first flow. Further, the flow controller is configured to receive the select data. Based on the select data, the flow controller accesses the storage circuit to read the first flow data.

In some examples, the processing circuit is further configured to receive configuration data and status data. The configuration data is indicative of the plurality of flows, the plurality of flow data, and an arbitration algorithm associated with the plurality of flows, and the status data is indicative of a current arbitration status of each flow of the plurality of flows. The set of flows is identified and the arbitration request is generated by the processing circuit based on the configuration data and the status data.

In some examples, each flow data of the plurality of flow data includes an identifier of a corresponding flow of the plurality of flows.

In some examples, the processing circuit is further configured to receive the configuration data. Based on the configuration data, the processing circuit is further configured to generate a plurality of flow weight counts associated with the plurality of flows, respectively, such that a first flow weight count of the plurality of flow weight counts is indicative of a weight of the first flow. Similarly, the processing circuit is further configured to generate, based on the configuration data, a plurality of transfer counts associated with the plurality of flows, respectively, such that a first transfer count of the plurality of transfer counts is indicative of a total transfer size of the first flow. When the first flow data is outputted, the first flow weight count and the first transfer count are decremented.

In some examples, the arbitration system further includes a priority table controller that is coupled with the processing circuit and the storage circuit. The priority table controller is configured to receive, from the processing circuit, an update request for updating the priority table. The processing circuit is further configured to generate the update request when the first flow weight count is equal to a first threshold value. The priority table controller is further configured to access, based on the update request, the storage circuit to update the priority table such that a flow priority level of the first flow is updated from a first value to a second value, and a flow priority level of a flow that is immediately below the first flow in the priority table is updated from a third value to the first value. The first value corresponds to a highest flow priority level of the set of flow priority levels, respectively, and the second value corresponds to a lowest flow priority level of a plurality of flow priority levels that are associated with the plurality of flows, respectively.

In some examples, the priority table controller is further configured to receive, from the processing circuit, a delete request for deleting the first flow data from the priority table. The processing circuit is further configured to generate the delete request when the first transfer count is equal to a second threshold value. The priority table controller is further configured to access, based on the delete request, the storage circuit to delete the first flow data from the priority table.

In some examples, the processing circuit is further configured to receive, for adding to the priority table, second flow data associated with a second flow, and generate an add request to add the second flow data to the priority table. The add request includes the second flow data. The priority table controller is further configured to receive the add request, and access the storage circuit to add the second flow data to the priority table. The second flow data is added to the priority table such that a flow priority level of the second flow data is one less than a lowest flow priority level of the plurality of flow priority levels that are associated with the plurality of flows, respectively.

In another embodiment of the present disclosure, an arbitration system for arbitrating between a plurality of flows for access to a shared resource is disclosed. The plurality of flows are associated with a plurality of channels. The arbitration system includes first and second storage circuits that are configured to store first and second priority tables that include a plurality of flow data associated with the plurality of flows and a plurality of channel data associated with the plurality of channels, respectively. The arbitration system further includes a processing circuit, first and second selection circuits, a flow controller, and a channel controller. The processing circuit is configured to identify, from the plurality of flows, a set of flows that are arbitrating for access to the shared resource. The set of flows includes first and second subsets of flows associated with first and second channels of the plurality of channels, respectively. The first selection circuit is coupled with the processing circuit and the first storage circuit, and configured to select, for accessing the shared resource, first and second flows from the first and second subsets of flows, respectively. Similarly, the second selection circuit is coupled with the processing circuit and the second storage circuit, and configured to select, for accessing the shared resource, one of the first and second channels. The flow controller is coupled with the first selection circuit and the first storage circuit, and configured to access the first storage circuit to read first and second flow data associated with the selected first and second flows, respectively, and output the first and second flow data. The channel controller is coupled with the flow controller and the second selection circuit, and configured to receive the first and second flow data, and output, based on the selected channel, one of the first and second flow data for granting one of the corresponding first and second flows access to the shared resource.

In yet another embodiment of the present disclosure, a system-on-chip (SoC) is disclosed. The SoC includes a shared resource, an arbitration system that is configured to arbitrate between a plurality of flows for access to the shared resource, and a direct memory access controller. The plurality of flows are associated with a plurality of channels. The arbitration system includes first and second storage circuits that are configured to store first and second priority tables that include a plurality of flow data associated with the plurality of flows and a plurality of channel data associated with the plurality of channels, respectively. The arbitration system further includes a processing circuit, first and second selection circuits, a flow controller, and a channel controller. The processing circuit is configured to identify, from the plurality of flows, a set of flows that are arbitrating for access to the shared resource. The set of flows includes first and second subsets of flows associated with first and second channels of the plurality of channels, respectively. The first selection circuit is coupled with the processing circuit and the first selection circuit, and configured to select, for accessing the shared resource, first and second flows from the first and second subsets of flows, respectively. Similarly, the second selection circuit is coupled with the processing circuit and the second selection circuit, and configured to select, for accessing the shared resource, one of the first and second channels. The flow controller is coupled with the first selection circuit and the first storage circuit, and configured to access the first storage circuit to read first and second flow data associated with the selected first and second flows, respectively, and output the first and second flow data. The channel controller is coupled with the flow controller and the second selection circuit, and configured to receive the first and second flow data, and output, based on the selected channel, one of the first and second flow data. The direct memory access controller is coupled with the channel controller, and configured to receive one of the first and second flow data, and grant, based on the received flow data, one of the first and second flows the access to the shared resource.

In some examples, the first selection circuit is further configured to generate first select data that is indicative of the selected first and second flows. The flow controller is further configured to receive the first select data. The flow controller accesses the first storage circuit to read the first and second flow data based on the first select data. Similarly, the second selection circuit is further configured to generate second select data that is indicative of the selected channel. The channel controller is further configured to receive the second select data. The channel controller outputs one of the first and second flow data based on the second select data.

In some examples, the first priority table includes the plurality of flow data such that each flow data and the corresponding flow have a flow priority level associated therewith, and the second priority table includes the plurality of channel data such that each channel data and the corresponding channel have a channel priority level associated therewith. Further, each flow data of the plurality of flow data includes an identifier of a corresponding flow of the plurality of flows and an identifier of one of the plurality of channels associated with the corresponding flow, and each channel data of the plurality of channel data includes an identifier of a corresponding channel of the plurality of channels.

In some examples, the processing circuit is further configured to generate, upon identification of the set of flows, a first arbitration request that is indicative of the first and second subsets of flows and a second arbitration request that is indicative of the first and second channels. The first selection circuit is further configured to receive the first arbitration request, and access the first storage circuit based on the first arbitration request to identify, for selecting the first and second flows, first and second sets of flow priority levels that are associated with the first and second subsets of flows, respectively. Similarly, the second selection circuit is further configured to receive the second arbitration request, and access the second storage circuit based on the second arbitration request to identify, for selecting one of the first and second channels, first and second channel priority levels that are associated with the first and second channels, respectively.

In some examples, the processing circuit is further configured to receive configuration data and status data. The configuration data is indicative of the plurality of flows, the plurality of flow data, the plurality of channels, the plurality of channel data, and an arbitration algorithm associated with the plurality of flows and the plurality of channels, and the status data is indicative of a current arbitration status of each flow of the plurality of flows. The first and second subsets of flows are identified and the first and second arbitration requests are generated by the processing circuit based on the configuration data and the status data.

In some examples, the processing circuit is further configured to receive the configuration data. Based on the configuration data, the processing circuit is further configured to generate a plurality of flow weight counts associated with the plurality of flows, respectively, such that a first flow weight count of the plurality of flow weight counts is indicative of a weight of the first flow. Similarly, the processing circuit is further configured to generate, based on the configuration data, a plurality of transfer counts associated with the plurality of flows, respectively, such that a first transfer count of the plurality of transfer counts is indicative of a total transfer size of the first flow. Further, based on the configuration data, the processing circuit is configured to generate a plurality of channel weight counts associated with the plurality of channels, respectively, such that a first channel weight count of the plurality of channel weight counts is indicative of a weight of the first channel. When the first flow data is outputted, the first flow weight count, the first transfer count, and the first channel weight count are decremented.

In some examples, the arbitration system further includes a first priority table controller that is coupled with the processing circuit and the first storage circuit. The first priority table controller is configured to receive, from the processing circuit, a first update request for updating the first priority table. The processing circuit is further configured to generate the first update request when the first flow weight count is equal to a first threshold value. Based on the first update request, the first priority table controller is further configured to access the first storage circuit to update the first priority table such that a flow priority level of the first flow is updated from a first value to a second value, and a flow priority level of a flow that is immediately below the first flow in the first priority table is updated from a third value to the first value. The first value corresponds to a highest flow priority level of one of the first and second sets of flow priority levels, and the second value corresponds to a lowest flow priority level of a plurality of flow priority levels that are associated with the plurality of flows, respectively.

In some examples, the first priority table controller is further configured to receive, from the processing circuit, a delete request for deleting the first flow data from the first priority table. The processing circuit is further configured to generate the delete request when the first transfer count is equal to a second threshold value. Based on the delete request, the first priority table controller is further configured to access the first storage circuit to delete the first flow data from the first priority table.

In some examples, the arbitration system further includes a second priority table controller that is coupled with the processing circuit and the second storage circuit. The second priority controller is configured to receive, from the processing circuit, a second update request for updating the second priority table. The processing circuit is further configured to generate the second update request when the first channel weight count is equal to a third threshold value. The second priority table controller is further configured to access, based on the second update request, the second storage circuit to update the second priority table such that a channel priority level of the first channel is updated from a fourth value to a fifth value, and a channel priority level of a channel that is immediately below the first channel in the second priority table is updated from a sixth value to the fourth value. The fourth value corresponds to a highest channel priority level of the first and second channel priority levels, and the fifth value corresponds to a lowest channel priority level of a plurality of channel priority levels that are associated with the plurality of channels, respectively.

In some examples, the processing circuit is further configured to receive, for adding to the first priority table, third flow data associated with a third flow, and generate an add request to add the third flow data to the first priority table. The add request includes the third flow data. The first priority table controller is further configured to receive the add request, and access the first storage circuit to add the third flow data to the first priority table. The third flow data is added to the first priority table such that a flow priority level of the third flow data is one less than a lowest flow priority level of a plurality of flow priority levels that are associated with the plurality of flows, respectively.

Various embodiments of the present disclosure disclose an arbitration system for arbitrating between a plurality of flows for access to a shared resource. The plurality of flows may be associated with a single channel or multiple channels. When the plurality of flows are associated with a single channel, the arbitration system is configured to select one flow from the plurality of flows for accessing the shared resource. The flow is selected based on flow priority levels of flows that are currently arbitrating for access to the shared resource. The arbitration system is further configured to output flow data associated with the selected flow for granting the selected flow the access to the shared resource. When the plurality of flows are associated with multiple channels, the arbitration system is further configured to select a flow associated with each channel based on the flow priority levels. The arbitration system is further configured to select a channel based on channel priority levels of channels that are currently arbitrating for access to the shared resource. Based on the selected channel, the arbitration system is further configured to output flow data associated with one of the selected flows for granting the corresponding flow and the selected channel the access to the shared resource.

The arbitration system of the present disclosure deletes a flow (i.e., flow data) from the priority table when the corresponding total transfer size is exhausted. The deletion of such a flow improves a quality of service of the arbitration system as latencies in data transfer operations or memory access operations associated with remaining flows of the priority table are avoided. Thus, the quality of service of the arbitration system of the present disclosure is significantly higher than that of a conventional arbitration system. Further, when a highest priority flow is awaiting metadata, the corresponding flow is considered not to be arbitrating for access to the shared resource, and a flow having a lower priority level than that of the highest priority flow is granted access to the shared resource. As a result, a performance (i.e., an efficiency) of the arbitration system of the present disclosure and a utilization of the shared resource of the present disclosure is significantly higher than that of the conventional arbitration system and the corresponding shared resource, respectively. Further, the arbitration system of the present disclosure includes one storage circuit (i.e., one priority table) for storing flow data and one storage circuit (i.e., one priority table) for storing channel data. Hence, when flows associated with multiple channels are arbitrating for access to the shared resource, an area occupied by the arbitration system of the present disclosure on the corresponding SoC is significantly less than that of the conventional arbitration system. Additionally, as a number of channels increase, the number of storage circuits (i.e., priority tables) included in the arbitration system remain unchanged. Thus, the scalability of the arbitration system of the present disclosure is less complex than that of the conventional arbitration system.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
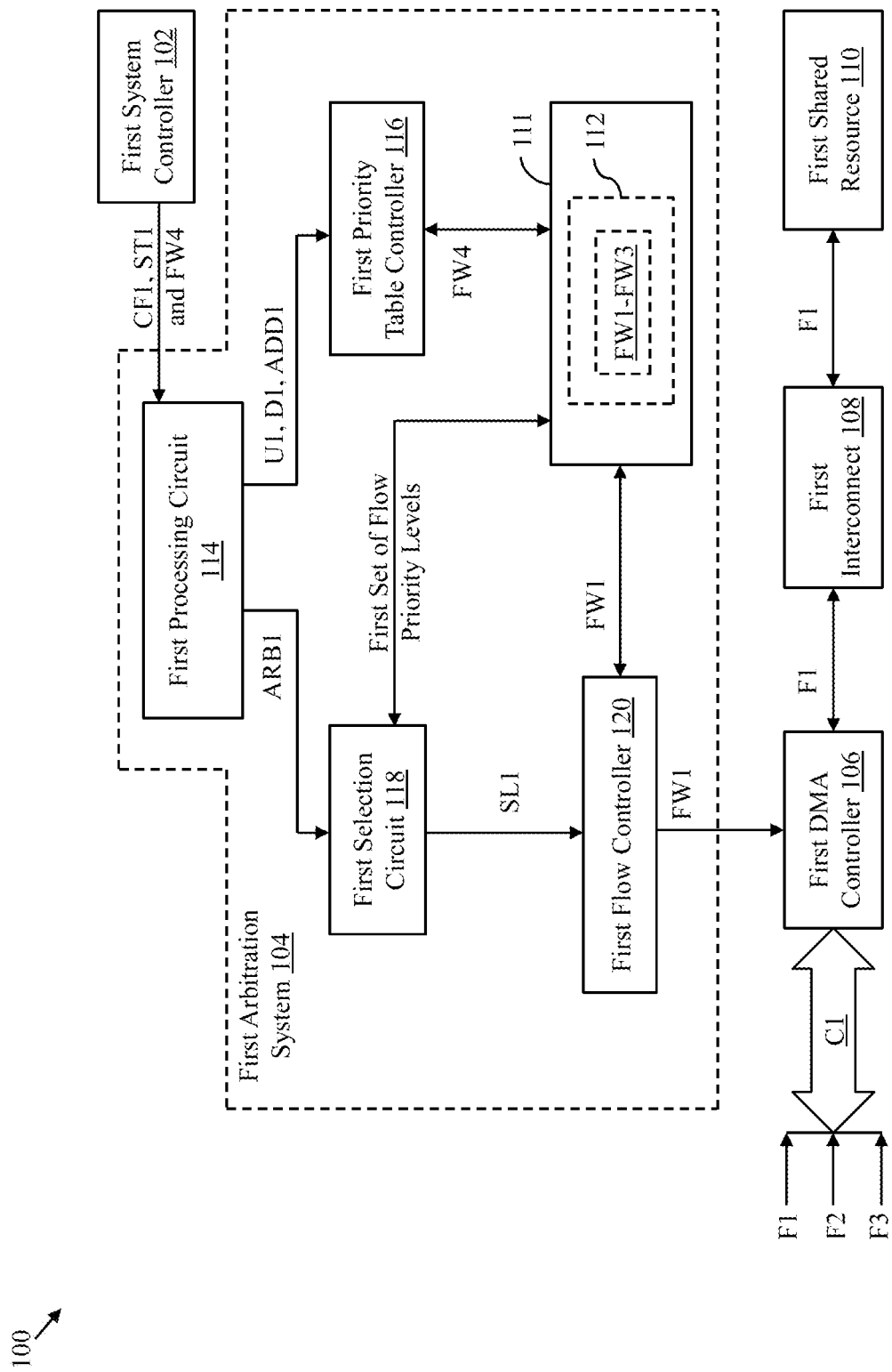
FIG. 1 illustrates a schematic block diagram of a system-on-chip (SoC) in accordance with an embodiment of the present disclosure.

FIG. 1 illustrates a schematic block diagram of a system-on-chip (SoC) 100 in accordance with an embodiment of the present disclosure. The SoC 100 includes a first system controller 102, a first arbitration system 104, a first direct memory access (DMA) controller 106, a first interconnect 108, and a first shared resource 110. In the presently preferred embodiment, the first shared resource 110 corresponds to a memory. The SoC 100 may be included in various devices such as automotive devices, mobile devices, network devices, or the like.

The first system controller 102 is coupled with the first arbitration system 104, and configured to generate and provide first configuration data CF1 to the first arbitration system 104. In an embodiment, the first system controller 102 provides the first configuration data CF1 to the first arbitration system 104 during a boot up of the SoC 100. The first configuration data CF1 is indicative of first through third flows F1-F3 that are arbitrating for access to the first shared resource 110, first through third flow data FW1-FW3 associated with the first through third flows F1-F3, respectively, and an arbitration algorithm associated with the first through third flows F1-F3. The first through third flows F1-F3 are associated with a single channel (i.e., a first channel C1). In one embodiment, each flow of the first through third flows F1-F3 is a stream of data packets that is generated by a source node (not shown) of a network environment (not shown). The first through third flows F1-F3 are collectively referred to as a "first plurality of flows F1-F3" and the first through third flow data FW1-FW3 are collectively referred to as a "first plurality of flow data FW1-FW3".

The first system controller 102 may further be configured to generate and provide first status data ST1 to the first arbitration system 104. The first status data ST1 is indicative of a current arbitration status of each flow of the first through third flows F1-F3. For example, the first status data ST1 indicates whether one or more flows of the first through third flows F1-F3 are awaiting associated metadata, and hence are currently not arbitrating for access to the first shared resource 110. Further, when a new flow, such as a fourth flow (not shown) associated with the first channel C1, is to be added to the flows that are arbitrating for access to the first shared resource 110, the first system controller 102 is further configured to generate and provide corresponding flow data, such as fourth flow data. FW4, to the first arbitration system 104.

The first arbitration system 104 is configured to arbitrate between the first through third flows F1-F3 for access to the first shared resource 110. Based on a flow priority level associated with each flow, one of the first through third flows F1-F3 is granted access to the first shared resource 110. For the sake of ongoing discussion, it is assumed that the first flow F1 is granted access to the first shared resource 110. The first arbitration system 104 includes a first storage circuit 111 that is configured to store a first priority table 112, a first processing circuit 114, a first priority table controller 116, a first selection circuit 118, and a first flow controller 120.

The first storage circuit 111 includes a first set of flip-flops (not shown) that is configured to store the first priority table 112. The first priority table 112 includes the first plurality of flow data FW1-FW3 associated with the first plurality of flows F1-F3, respectively, such that each flow data and the corresponding flow have a flow priority level associated therewith. Thus, the first through third flow data FW1-FW3 and the corresponding first through third flows F1-F3 have first through third flow priority levels associated therewith, respectively. Each flow data of the first through third flow data FW1-FW3 corresponds to identification information of the corresponding flow, and includes an identifier of the corresponding flow and an identifier of the first channel C1 that is associated with the corresponding flow. For example, the first flow data FW1 includes an identifier of the first flow F1 and an identifier of the first channel C1. Each flow data of the first through third flow data FW1-FW3 may additionally include information such as a context of the corresponding flow, an operation associated with the corresponding flow, or the like. For the sake of ongoing discussion, it is assumed that the first flow F1 has a highest flow priority level, and the third flow F3 has a lowest flow priority level. Consequently, a flow priority level associated with the second flow F2 is less than that associated with the first flow F1 and greater than that associated with the third flow F3.

The first processing circuit 114 is coupled with the first system controller 102, and configured to receive the first configuration data CF1 and the first status data ST1. Based on the first configuration data CF1 and the first status data ST1, the first processing circuit 114 is further configured to identify, from the first through third flows F1-F3, a first set of flows that are currently arbitrating for access to the first shared resource 110. For the sake of ongoing discussion, it is assumed that the third flow F3 is awaiting metadata and hence is considered not to be currently arbitrating for access to the first shared resource 110. Thus, the first set of flows includes the first and second flows F1 and F2. Upon identification of the first and second flows F1 and F2, the first processing circuit 114 is further configured to generate a first arbitration request ARB1 that is indicative of the identified first and second flows F1 and F2. The first arbitration request ARB1 is generated based on the first configuration data CF1 and the first status data ST1.

The first processing circuit 114 is further configured to generate, based on the first configuration data CF1, first through third flow weight counts (not shown) associated with the first through third flows F1-F3, respectively. The first through third flow weight counts are collectively referred to as a "first plurality of flow weight counts". The first through third flow weight counts are generated at first through third predetermined values, and are indicative of weights of the first through third flows F1-F3, respectively. A weight of a flow corresponds to a size of associated data that is to be transmitted to or received from the first shared resource 110 when the corresponding flow is granted access to the first shared resource 110.

Based on the first configuration data CF1, the first processing circuit 114 is further configured to generate first through third transfer counts (not shown) associated with the first through third flows F1-F3, respectively. The first through third transfer counts are collectively referred to as a "plurality of transfer counts". The first through third transfer counts are generated at fourth through sixth predetermined values, and are indicative of total transfer sizes of the first through third flows F1-F3, respectively. In an embodiment, the fourth through sixth predetermined values are greater than the first through third predetermined values, respectively. A total transfer size of a flow corresponds to a total size of the associated data that is to be transmitted to or received from the first shared resource 110 over multiple accesses. When one of the first through third flows F1-F3 is granted access to the first shared resource 110, the corresponding weight and flow transfer counts are decremented. For example, when the first flow F1 is granted access to the first shared resource 110, the first flow weight count and the first transfer count are decremented.

The first processing circuit 114 is further configured to generate various update requests to update the first priority table 112 such that flow priority levels of the flows that are granted access to the first shared resource 110 are updated. Such update requests are generated when flow weight counts of the corresponding flows are equal to a first threshold value. For example, the first processing circuit 114 is further configured to generate a first update request U1 to update the first priority table 112 such that the first flow priority level of the first flow F1 is updated. The first update request U1 is generated when the first flow weight count is equal to the first threshold value. In an example, the first threshold value is equal to zero. An equality of the first flow weight count and the first threshold value indicates that the weight of the first flow F1 is exhausted.

The first processing circuit 114 is further configured to generate various delete requests to delete various flow data from the first priority table 112. Such delete requests are generated when transfer counts of the corresponding flows are equal to a second threshold value. For example, the first processing circuit 114 is further configured to generate a first delete request D1 for deleting the first flow data FW1 from the first priority table 112. The first delete request D1 is generated when the first transfer count is equal to the second threshold value. In an example, the second threshold value is equal to zero. An equality of the first transfer count and the second threshold value indicates that the total transfer size of the first flow F1 is exhausted (i.e., the first flow F1 is no longer arbitrating for access to the first shared resource 110).

The first processing circuit 114 is further configured to generate various add requests for adding flow data to the first priority table 112. For example, when a new flow (such as the fourth flow) is to be added to the flows that are arbitrating for access to the first shared resource 110, the first processing circuit 114 is further configured to receive the corresponding flow data (such as the fourth flow data FW4) from the first system controller 102. Based on the received fourth flow data FW4, the first processing circuit 114 is further configured to generate a first add request ADD1 for adding the fourth flow data FW4 to the first priority table 112. The first add request ADD1 includes the fourth flow data FW4.

The first priority table controller 116 is coupled with first storage circuit 111, and configured to execute various access operations associated with the first storage circuit 111. Examples of such operations include update operations, deletion operations, addition operations, or the like.

The first priority table controller 116 is further coupled with the first processing circuit 114, and further configured to receive various update requests, and access the first storage circuit 111 to update the first priority table 112. For the example, the first priority table controller 116 is configured to receive the first update request U1 from the first processing circuit 114 for updating the first priority table 112. Based on the first update request U1, the first priority table controller 116 is further configured to access the first storage circuit 111 to update the first priority table 112. The first priority table 112 is updated such that the first flow priority level is updated from a first value to a second value, and the second flow priority level of the second flow F2 (i.e., a flow that is immediately below the first flow F1 in the first priority table 112) is updated from a third value to the first value. The first value corresponds to a highest flow priority level of the first and second flow priority levels (i.e., the flow priority levels of the flows that are currently arbitrating), the second value corresponds to a lowest flow priority level of the first through third flow priority levels, and the third value is one less than the first value. In other words, upon the updation of the first priority table 112 based on the first update request U1, the first flow F1 has the lowest flow priority level, the second flow F2 has the highest flow priority level, and the third flow priority level associated with the third flow F3 is less than the second flow priority level and greater than the first flow priority level.

The first priority table controller 116 is further configured to receive, from the first processing circuit 114, various delete requests, and access the first storage circuit III to delete various entries (i.e., flow data) from the first priority table 112. For the example, the first priority table controller 116 is further configured to receive, from the first processing circuit 114, the first delete request D1 for deleting the first flow data FW1 from the first priority table 112. Based on the first delete request D1, the first processing circuit 114 is further configured to access the first storage circuit 111 to delete the first flow data FW1 from the first priority table 112. Upon deletion of the first flow data FW1, the flow priority levels of the flow data that are below the first flow data FW1 are increased by one.

The first priority table controller 116 is further configured to receive, from the first processing circuit 114, various add requests, and access the first storage circuit 111 to add various entries (i.e., flow data) to the first priority table 112. For the example, the first priority table controller 116 is further configured to receive the first add request ADD 1 from the first processing circuit 114 for adding the fourth flow data FW4 to the first priority table 112. Based on the first add request ADD1, the first priority table controller 116 is further configured to access the first storage circuit 111 to add the fourth flow data FW4 to the first priority table 112. The fourth flow data FW4 is added to the first priority table 112 such that a fourth flow priority level (not shown) of the fourth flow data FW4 is one less than the lowest flow priority level of the first through third flow priority levels. In an embodiment, prior to adding the fourth flow data FW4 to the first priority table 112, the first processing circuit 114 may determine an occupancy status of each row of the first priority table 112 to identify the rows that are currently occupied. The first processing circuit 114 may then add the fourth flow data FW4 to an unoccupied row that is immediately below a last occupied row. It will be apparent to a person skilled in the art that in addition to adding the fourth flow data FW4 to the first priority table 112, the first processing circuit 114 is further configured to generate a fourth flow weight count (not shown) and a fourth transfer count (not shown) for the fourth flow.

The first selection circuit 118 is coupled with the first processing circuit 114, and configured to receive the first arbitration request ARB1. The first selection circuit 118 is further coupled with the first storage circuit 111, and further configured to access, based on the first arbitration request ARB1, the first storage circuit 111 to identify a first set of flow priority levels associated with the first set of flows, respectively. The first set of flow priority levels thus includes the first and second flow priority levels associated with the first and second flows F1 and F2, respectively. Further, based on the first and second flow priority levels, the first selection circuit 118 is configured to select one of the first and second flows F1 and F2 for accessing the first shared resource 110. In one embodiment, the flow that has the highest flow priority level is selected. Thus, as the first flow priority level is the highest of the first and second flow priority levels, the first selection circuit 118 selects the first flow F1. Upon the selection of the first flow F1, the first selection circuit 118 is further configured to generate first select data SL1 that is indicative of the selected first flow F1.

The first flow controller 120 is coupled with the first selection circuit 118 and the first storage circuit 111. The first flow controller 120 is configured to receive the first select data. SL1 from the first selection circuit 118. Based on the first select data SL1, the first flow controller 120 is further configured to access the first storage circuit 111 to read the first flow data FW1 associated with the selected first flow F1, and output the first flow data F1-F3 for granting the first flow F1 access to the first shared resource 110.

The first DMA controller 106 is coupled with the first arbitration system 104 (i.e., the first flow controller 120), and configured to receive the first flow data FW1. The first DMA controller 106 is further coupled with the source nodes associated with each of the first through third flows F1-F3, and further configured to receive, by way of the first channel C1, the first through third flows F1-F3, respectively. Based on the received flow data, the first DMA controller 106 is configured to grant one of the first through third flows F1-F3 the access to the first shared resource 110. As the received flow data is the first flow data FW1, the first DMA controller 106 grants the first flow F1 the access to the first shared resource 110.

The access to the first shared resource 110 is granted by way of the first interconnect 108 that is coupled between the first DMA controller 106 and the first shared resource 110. For example, the first interconnect 108 receives the first flow F1 from the first DMA controller 106, and provides the first flow F1 to the first shared resource 110, thereby granting the first flow F1 access to the first shared resource 110. The first shared resource 110 is thus accessed by way of the first channel C1, the first DMA controller 106, and the first interconnect 108. The access grant may correspond to an execution of an operation associated with the first flow F1. For example, when the first shared resource 110 corresponds to a memory, the first shared resource 110 is accessed to execute memory access operations (i.e., read and write operations).

Although in the presently preferred embodiment of the present disclosure the first shared resource 110 corresponds to a memory, it will be apparent to a person skilled in the art that the scope of the present disclosure is not limited to it. In various other embodiments, the first shared resource 110 may correspond to various other components of the SoC 100 (such as a data bus (not shown)), without deviating from the scope of the present disclosure. In such a scenario, flow data of a selected flow (such as the first flow data FW1) is outputted to a bus controller (not shown).

In operation, during the boot up of the SoC 100, the first system controller 102 generates and provides the first configuration data CF1 to the first arbitration system 104 (i.e., the first processing circuit 114). The first configuration data CF1 is indicative of the first through third flows F1-F3 that are arbitrating for access to the first shared resource 110, the first through third flow data FW1-FW3 associated with the first through third flows F1-F3, respectively, and the arbitration algorithm associated with the first through third flows F1-F3. Further, the first storage circuit 111 is initialized to store therein the first priority table 112 including the first through third flow data FW1-FW3. In one embodiment, the initialization of the first storage circuit 111 during the boot up of the SoC 100 is executed by the first system controller 102. The first system controller 102 may additionally generate and provide, after the boot up and during an operation of the SoC 100, the first status data ST1 to the first arbitration system 104 (i.e., the first processing circuit 114). The first status data ST1 indicates whether any of the first through third flows F1-F3 are awaiting associated metadata, and hence are currently not arbitrating for access to the first shared resource 110.

Based on the first configuration data CF1 and the first status data ST1, the first processing circuit 114 identifies, from the first through third flows F1-F3, the first set of flows (i.e., the first and second flows F1 and F2) that are currently arbitrating for access to the first shared resource 110. The first processing circuit 114 then generates the first arbitration request ARB1 that is indicative of the identified first and second flows F1 and F2, and provides the first arbitration request ARB1 to the first selection circuit 118.

Based on the first arbitration request ARB1, the first selection circuit 118 accesses the first storage circuit 111 to identify the first set of flow priority levels (i.e., the first and second flow priority levels) associated with the first set of flows, respectively. As the first flow priority level is the highest of the first set of flow priority levels, the first selection circuit 118 selects the first flow F1 for accessing the first shared resource 110, and generates the first select data SL1 indicative of the selected first flow F1. Further, the first selection circuit 118 provides the first select data SL1 to the first flow controller 120.

Based on the first select data SL1, the first flow controller 120 accesses the first storage circuit 111 to read the first flow data FW1 stored therein, and outputs and provides the first flow data FW1 to the first DMA controller 106. Based on the outputted first flow data FW1, the first flow F1 is granted access to the first shared resource 110.

When the first flow data FW1 is outputted (i.e., the first flow F1 is granted access to the first shared resource 110), the first flow weight count and the first transfer count are decremented with each data transfer associated with the first flow F1. When the flow weight count of a flow is equal to the first threshold value, the first processing circuit 114 generates an update request for updating the first priority table 112 (i.e., the flow priority level of the corresponding flow in the first priority table 112). For example, when the first flow weight count is equal to the first threshold value, the first processing circuit 114 generates and provides the first update request U1 to the first priority table controller 116. The first update request U1 is indicative of the exhaustion of the weight of the first flow F1.

Based on the first update request U1, the first priority table controller 116 accesses the first storage circuit 111 to update the first priority table 112 such that the first flow priority level of the first flow F1 is updated from the first value to the second value, and the second flow priority level of the second flow F2 (i.e., the flow that is immediately below the first flow F1 in the first priority table 112) is updated from the third value to the first value. The first flow data FW1 and the first flow F1 thus have the lowest flow priority level of the first through third flow priority levels. Further, the first flow weight count may be reset to the first predetermined value after the generation of the first update request U1. It will be apparent to a person skilled in the art that for each subsequent arbitration request that is generated, one of the first through third flow data FW1-FW3 is outputted (i.e., one of the first through third flows F1-F3 is granted access to the first shared resource 110) in a similar manner as described above. With each access grant, the transfer count of the corresponding flow is further decremented.

When the transfer count of a flow is equal to the second threshold value, the first processing circuit 114 generates a delete request for deleting the corresponding flow (i.e., the corresponding flow data) from the first priority table 112. For example, when the first transfer count is equal to the second threshold value, the first processing circuit 114 generates and provides the first delete request D1 to the first priority table controller 116. The first delete request D1 is indicative of the exhaustion of the total transfer size of the first flow F1. Based on the first delete request D1, the first priority table controller 116 accesses the first storage circuit 111 to delete the first flow data FW1 stored therein. In such a scenario, the flow priority levels of the flow data placed below the first flow data FW1 are incremented by one. It will be apparent to a person skilled in the art that the second and third flow data FW2 and FW3 are deleted from the first priority table 112 in a similar manner as described above (i.e., when the corresponding transfer counts are equal to the second threshold value).

The present disclosure further facilitates addition of new flow data to the first priority table 112 when the corresponding flow is added to the flows that are arbitrating for access to the first shared resource 110. For example, when the fourth flow is added to the flows that are arbitrating for access to the first shared resource 110, the first system controller 102 generates and provides the associated fourth flow data FW4 to the first arbitration system 104 (i.e., the first processing circuit 114). The first processing circuit 114 then generates the first add request ADD1 inclusive of the fourth flow data FW4, and provides the first add request ADD1 to the first priority table controller 116. Based on the first add request ADD1, the first priority table controller 116 accesses the first storage circuit 111 to add the fourth flow data FW4 to the first priority table 112. The fourth flow data FW4 is added such that the fourth flow priority level is one less than the lowest flow priority level of the first through third flow priority levels. Upon the addition of the fourth flow data FW4 to the first priority table 112, a total of four flows arbitrate for access to the first shared resource 110, and the operations executed by the first arbitration system 104 for arbitrating between the first through third flows F1-F3 and the fourth flow are similar to the operations executed for arbitrating between the first through third flows F1-F3 as described above.

Although FIG. 1 illustrates that three flows (i.e., the first through third flows F1-F3) are arbitrating for access to the first shared resource 110, the scope of the present disclosure is not limited to it. In various other embodiments, more than or less than three flows associated with a single channel (i.e., the first channel C1) may be arbitrating for access to the first shared resource 110, without deviating from the scope of the present disclosure.

It will be apparent to a person skilled in the art that the scope of the present disclosure is not limited to the first DMA controller 106 being coupled with a single channel (i.e., the first channel C1). In various other embodiments, the first DMA controller 106 may be coupled with two or more channels with multiple flows arbitrating for access on each channel, without deviating from the scope of the present disclosure. In such a scenario, each channel has a dedicated access to the first shared resource 110, and the arbitration associated with each channel is similar to the arbitration described above.

Figure 2:
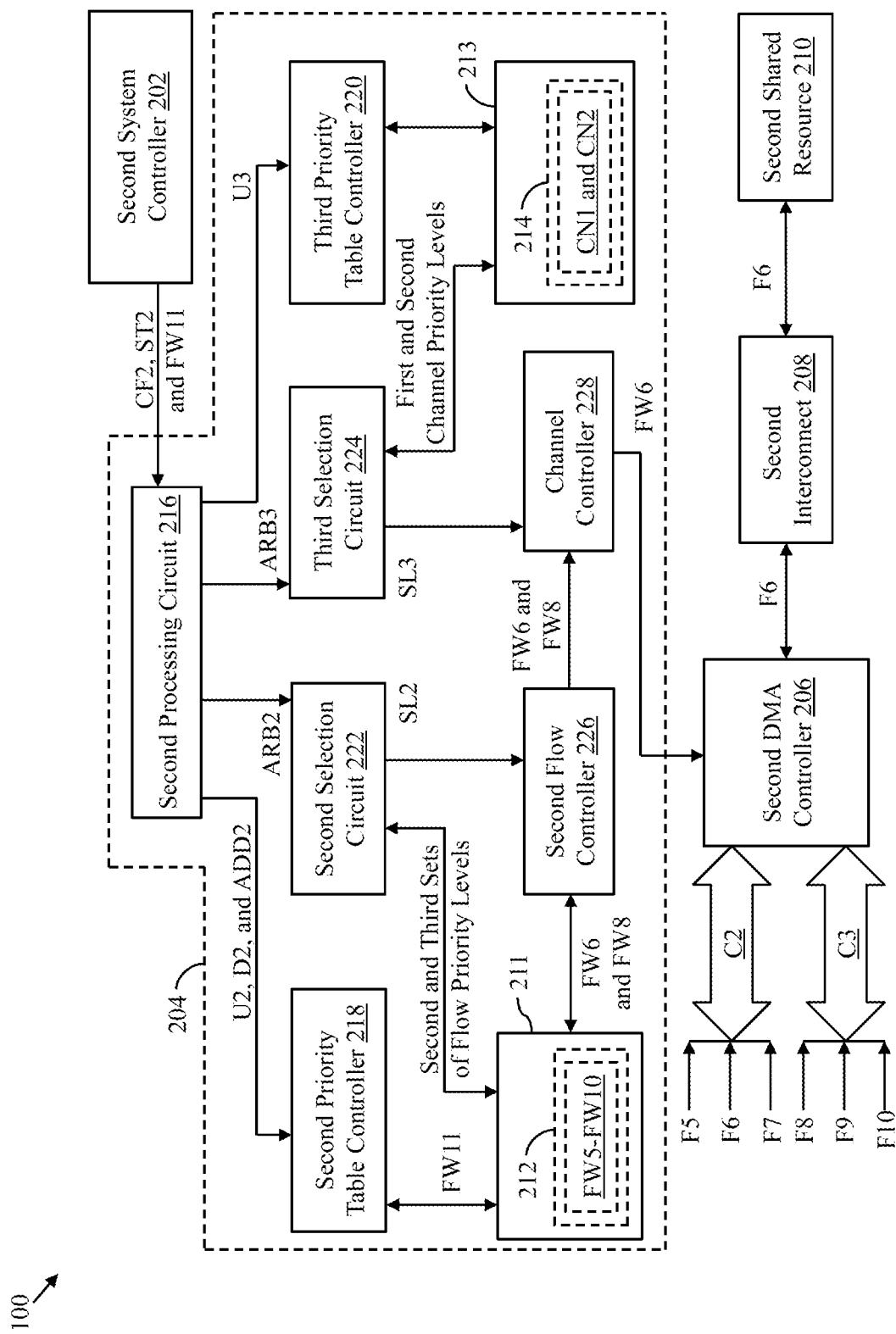
FIG. 2 illustrates a schematic block diagram of the SoC in accordance with another embodiment of the present disclosure.

FIG. 2 illustrates a schematic block diagram of the SoC 100 in accordance with another embodiment of the present disclosure. As illustrated in FIG. 2, the SoC 100 includes a second system controller 202, a second arbitration system 204, a second DMA controller 206, a second interconnect 208, and a second shared resource 210. In the presently preferred embodiment, the second shared resource 210 is a memory.

The second system controller 202 is coupled with the second arbitration system 204, and configured to generate and provide second configuration data CF2 to the second arbitration system 204. The second system controller 202 provides the second configuration data CF2 during a boot up of the SoC 100. The second configuration data CF2 is indicative of fifth through tenth flows F5-F10 that are arbitrating for access to the second shared resource 210 and fifth through tenth flow data FW5-FW10 associated with the fifth through tenth flows F5-F10, respectively. The fifth through tenth flows F5-F10 are collectively referred to as a "second plurality of flows F5-F10" and the fifth through tenth flow data FW5-FW10 are collectively referred to as a "second plurality of flow data FW5-FW10".

The second plurality of flows F5-F10 are associated with a plurality of channels. For the sake of ongoing discussion, it is assumed that the second plurality of flows F5-F10 are associated with two channels such that the fifth through seventh flows F5-F7 are associated with one channel (i.e., a second channel C2) and the eighth through tenth flows F8-F10 are associated with another channel (i.e., a third channel C3). In such a scenario, the second configuration data CF2 is further indicative of the second and third channels C2 and C3, first and second channel data CN1 and CN2 associated with the second and third channels C2 and C3, respectively, and an arbitration algorithm associated with the fifth through tenth flows F5-F10 and the second and third channels C2 and C3.

The second system controller 202 may further be configured to generate and provide second status data ST2 to the second arbitration system 204. The second status data ST2 is indicative of a current arbitration status of each flow of the fifth through tenth flows F5-F10. For example, the second status data ST2 indicates whether one or more flows of the fifth through tenth flows F5-F10 are awaiting metadata and hence are currently not arbitrating for access to the second shared resource 210. Further, when a new flow, such as an eleventh flow (not shown), is to be added to the flows that are arbitrating for access to the second shared resource 210, the second system controller 202 is further configured to generate and provide corresponding flow data, such as eleventh flow data FW11, to the second arbitration system 204.

The second arbitration system 204 is configured to arbitrate between the fifth through tenth flows F5-F10 for access to the second shared resource 210. Based on a flow priority level associated with each flow and a channel priority level associated with each channel, one of the fifth through tenth flows F5-F10 and the corresponding channel are granted access to the second shared resource 210. For the sake of ongoing discussion, it is assumed that the sixth flow F6 associated with the second channel C2 is granted access to the second shared resource 210. The second arbitration system 204 includes a second storage circuit 211 configured to store a second priority table 212, a third storage circuit 213 configured to store a third priority table 214, a second processing circuit 216, second and third priority table controllers 218 and 220, second and third selection circuits 222 and 224, a second flow controller 226, and a channel controller 228.

The second storage circuit 211 includes a second set of flip-flops (not shown) that is configured to store the second priority table 212. The second priority table 212 includes fifth through tenth flow data FW5-FW10 associated with the fifth through tenth flows F5-F10, respectively, such that each flow data and the corresponding flow have a flow priority level associated therewith. Thus, the fifth through tenth flow data FW5-FW10 and the corresponding fifth through tenth flows F5-F10 have fifth through tenth flow priority levels associated therewith, respectively. Each flow data of the fifth through tenth flow data FW5-FW10 corresponds to identification information of the corresponding flow, and includes an identifier of the corresponding flow and an identifier of one of the second and third channels C2 and C3 associated with the corresponding flow. For example, the fifth flow data FW5 includes an identifier of the fifth flow F5 and the identifier of the second channel C2. Each flow data of the fifth through tenth flow data FW5-FW10 may additionally include information such as a context of the corresponding flow, an operation associated with the corresponding flow, or the like. For the sake of ongoing discussion, it is assumed that the fifth flow F5 has a highest flow priority level, followed by the sixth through tenth flows F6-F10 in order of decreasing flow priority levels.

The third storage circuit 213 includes a third set of flip-flops (not shown) that is configured to store the third priority table 214. The third priority table 214 includes the first and second channel data CN1 and CN2 associated with the second and third channels C2 and C3, respectively. The first and second channel data CN1 and CN2 is collectively referred to as a "plurality of channel data CN1 and CN2". The first and second channel data CN1 and CN2 are stored such that each channel data and the corresponding channel have a channel priority level associated therewith. Thus, the first and second channel data CN1 and CN2 and the corresponding second and third channels C2 and C3 have first and second channel priority levels associated therewith, respectively. For the sake of ongoing discussion, it is assumed that the second channel C2 has a higher channel priority level than the third channel C3. Each channel data of the first and second channel data CN1 and CN2 includes an identifier of a corresponding channel. For example, the first channel data CN1 includes an identifier of the second channel C2. Each channel data of the first and second channel data. CN1 and CN2 may additionally include information such as total size of data to be transferred over the corresponding channel, a number of flows associated with the corresponding channel, or the like.

The second processing circuit 216 is coupled with the second system controller 202, and configured to receive the second configuration data CF2 and the second status data ST2. Based on the second configuration data CF2 and the second status data ST2, the second processing circuit 216 is further configured to identify, from the fifth through tenth flows F5-F10, a second set of flows that are currently arbitrating for access to the second shared resource 210. For the sake of ongoing discussion, it is assumed that the fifth and tenth flows F5 and F10 are awaiting metadata, and hence are considered not to be arbitrating for access to the second shared resource 210. Thus, the second set of flows includes the sixth through ninth flows F6-F9. In other words, the second set of flows includes a first subset of flows (i.e., the sixth and seventh flows F6 and F7) that is associated with the second channel C2, and a second subset of flows (i.e., the eighth and ninth flows F8 and F9) that is associated with the third channel C3. Upon identification of the sixth through ninth flows F6-F9, the second processing circuit 216 is further configured to generate a second arbitration request ARB2 that is indicative of the identified first and second subsets of flows (i.e., the sixth through ninth flows F6-F9), and a third arbitration request ARB3 that is indicative of the second and third channels C2 and C3 associated with the first and second subsets of flows, respectively. The second and third arbitration requests ARB2 and ARB3 are generated based on the second configuration data CF2 and the second status data ST2.

The second processing circuit 216 is further configured to generate, based on the second configuration data CF2, fifth through tenth flow weight counts (not shown) associated with the fifth through tenth flows F5-F10, respectively. The fifth through tenth flow weight counts are collectively referred to as a "second plurality of flow weight counts". The fifth through tenth flow weight counts are generated at seventh through twelfth predetermined values, and are indicative of weights of the fifth through tenth flows F5-F10, respectively. Similarly, based on the second configuration data CF2, the second processing circuit 216 is further configured to generate first and second channel weight counts (not shown) associated with the second and third channels C2 and C3, respectively. The first and second channel weight counts are collectively referred to as a "plurality of channel weight counts". The first and second channel weight counts are generated at thirteenth and fourteenth predetermined values, and are indicative of weights of the second and third channels C2 and C3, respectively.

The second processing circuit 216 is further configured to generate, based on the second configuration data CF2, fifth through tenth transfer counts (not shown) associated with the fifth through tenth flows F5-F10, respectively. The fifth through tenth transfer counts are collectively referred to as a "second plurality of transfer counts". The fifth through tenth transfer counts are generated at fifteenth through twentieth predetermined values, and are indicative of total transfer sizes of the fifth through tenth flows F5-F10, respectively. In an embodiment, the fifteenth through twentieth predetermined values are greater than the seventh through twelfth predetermined values, respectively. When one of the fifth through tenth flows F5-F10 is granted access to the second shared resource 210, the corresponding flow weight count, channel weight count, and the transfer count are decremented. For example, when the sixth flow F6 is granted access to the second shared resource 210, the sixth flow weight count, the first channel weight count, and the sixth transfer count are decremented.

The second processing circuit 216 is further configured to generate various update requests to update the second priority table 212 such that flow priority levels of the flows that are granted access to the second shared resource 210 are updated. Such update requests are generated when flow weight counts of the corresponding flows are equal to a third threshold value. For example, the second processing circuit 216 is further configured to generate a second update request U2 to update the second priority table 212 such that the sixth flow priority level of the sixth flow F6 is updated. The second update request U2 is generated when the sixth flow weight count is equal to the third threshold value. In an example, the third threshold value is equal to zero. An equality of the sixth flow weight count and the third threshold value indicates that the weight of the sixth flow F6 is exhausted. Similarly, the second processing circuit 216 is further configured to generate various update requests to update the third priority table 214 such that channel priority levels of the channels that are granted access to the second shared resource 210 are updated. Such update requests are generated when channel weight counts of the corresponding channels are equal to a fourth threshold value. For example, the second processing circuit 216 is further configured to generate a third update request U3 to update the third priority table 214 such that the first channel priority level of the second channel C2 is updated. The third update request U3 is generated when the first channel weight count is equal to the fourth threshold value. In one example, the fourth threshold value is equal to zero. An equality of the first channel weight count and the fourth threshold value indicates that the weight of the second channel C2 is exhausted.

The second processing circuit 216 is further configured to generate various delete requests to delete various flow data from the second priority table 212. Such delete requests are generated when transfer counts of the corresponding flows are equal to a fifth threshold value. For example, the second processing circuit 216 is further configured to generate a second delete request D2 for deleting the sixth flow data FW6 from the second priority table 212. The second delete request D2 is generated when the sixth transfer count is equal to the fifth threshold value. In an example, the fifth threshold value is equal to zero. An equality of the sixth transfer count and the fifth threshold value indicates that the total data transfer size of the sixth flow F6 is exhausted (i.e., the sixth flow F6 is no longer arbitrating for access to the second shared resource 210).

The second processing circuit 216 is further configured to generate various add requests for adding flow data to the second priority table 212. For example, when a new flow (such as the eleventh flow) is to be added to the flows that are arbitrating for the second shared resource 210, the second processing circuit 216 is further configured to receive the corresponding flow data (such as the eleventh flow data FW11) from the second system controller 202. The second processing circuit 216 is further configured to generate a second add request ADD2 for adding the eleventh flow data FW11 to the second priority table 212. The second add request ADD2 includes the eleventh flow data FW11.

The second priority table controller 218 is coupled with second storage circuit 211, and configured to execute various access operations associated with the second storage circuit 211. Examples of such operations include update operations, deletion operations, addition operations, or the like.

The second priority table controller 218 is further coupled with the second processing circuit 216, and further configured to receive various update requests, and access the second storage circuit 211 to update the second priority table 212. For the example, the second priority table controller 218 is further configured to receive the second update request U2 for updating the second priority table 212. Based on the second update request U2, the second priority table controller 218 is further configured to access the second storage circuit 211 to update the second priority table 212. The second priority table 212 is updated such that the sixth flow priority level of the sixth flow F6 is updated from a fourth value to a fifth value, and the seventh flow priority level of the seventh flow F7 (i.e., a flow that is immediately below the sixth flow F6 in the second priority table 212) is updated from a sixth value to the fourth value. The fourth value corresponds to a current flow priority level of the sixth flow F6 (i.e., a highest flow priority level of one of the second and third sets of flow priority levels associated with the first and second subsets of flows, respectively), the fifth value corresponds to a lowest flow priority level of the fifth through tenth flow priority levels, and the sixth value is one less than the fourth value. In other words, upon the updation of the second priority table 212 based on the second update request U2, the flow priority level associated with the fifth flow F5 remains unchanged, the flow priority levels associated with seventh through tenth flows F7-F10 increase by one, and the flow priority level associated with the sixth flow F6 is the lowest flow priority level in the second priority table 212.

The second priority table controller 218 is further configured to receive, from the second processing circuit 216, various delete requests, and access the second storage circuit 211 to delete entries (i.e., flow data) from the second priority table 212. For the example, the second priority table controller 218 is further configured to receive, from the second processing circuit 216, the second delete request D2 for deleting the sixth flow data FW6 from the second priority table 212. Based on the second delete request D2, the second processing circuit 216 is further configured to access the second storage circuit 211 to delete the sixth flow data FW6 from the second priority table 212. Upon deletion of the sixth flow data FW6, the flow priority levels of the flow data that are below the sixth flow data FW6 are incremented by one.

The second priority table controller 218 is further configured to receive, from the second processing circuit 216, various add requests, and access the second storage circuit 211 to add entries (i.e., flow data) to the second priority table 212. For the example, the second priority table controller 218 is further configured to receive the second add request ADD2 from the second processing circuit 216, and access the second storage circuit 211 to add the eleventh flow data FW11 to the second priority table 212. The fourth flow data FW4 is added to the second priority table 212 such that an eleventh flow priority level (not shown) of the eleventh flow data FW11 is one less than the lowest flow priority level of the fifth through tenth flow priority levels. In an embodiment, prior to adding the eleventh flow data FW11 to the second priority table 212, the second processing circuit 216 may determine an occupancy status of each row of the second priority table 212 to identify the rows that are currently occupied. The second processing circuit 216 may then add the eleventh flow data FW11 to an unoccupied row that is immediately below a last occupied row. It will be apparent to a person skilled in the art that in addition to adding the eleventh flow data FW11 to the second priority table 212, the second processing circuit 216 is further configured to generate an eleventh flow weight count (not shown) and an eleventh transfer count (not shown) for the eleventh flow.

The third priority table controller 220 is coupled with third storage circuit 213, and configured to execute various update operations associated with the third storage circuit 213. The third priority table controller 220 is further coupled with the second processing circuit 216, and configured to receive various update requests, and access the third storage circuit 213 to update the third priority table 214. For example, the third priority table controller 220 is further configured to receive the third update request U3 from the second processing circuit 216 for updating the third priority table 214. Based on the third update request U3, the third priority table controller 220 is further configured to access the third storage circuit 213 to update the third priority table 214. The third priority table 214 is updated such that the first and second channel priority levels are swapped. In other words, upon the updation of the third priority table 214 based on the third update request U3, the second channel priority level is higher than the first channel priority level.

The second selection circuit 222 is coupled with the second processing circuit 216, and configured to receive the second arbitration request ARB2. The second selection circuit 222 is further coupled with the second storage circuit 211, and further configured to access, based on the second arbitration request ARB2, the second storage circuit 211 to identify the second and third sets of flow priority levels associated with the first and second subsets of flows, respectively. The second set of flow priority levels thus includes the sixth and seventh flow priority levels, and the third set of flow priority levels includes the eighth and ninth flow priority levels. Further, based on the second and third sets of flow priority levels, the second selection circuit 222 is configured to select a flow from each of the first and second subsets of flows for accessing the second shared resource 210, respectively. In one embodiment, the flows that have the highest flow priority levels in the corresponding sets of flow priority levels are selected. As the sixth flow priority level is the highest of the second set of flow priority levels, and the eighth flow priority level is the highest of the third set of flow priority levels, the second selection circuit 222 selects the sixth and eighth flows F6 and F8. Upon the selection of the sixth and eighth flows F6 and F8, the second selection circuit 222 is further configured to generate second select data SL2 that is indicative of the selected sixth and eighth flows F6 and F8, respectively.

The third selection circuit 224 is coupled with the second processing circuit 216, and configured to receive the third arbitration request ARB3. The third selection circuit 224 is further coupled with the third storage circuit 213, and further configured to access, based on the third arbitration request ARB3, the third storage circuit 213 to identify the first and second channel priority levels associated with the second and third channels C2 and C3, respectively. Further, based on the first and second channel priority levels, the third selection circuit 224 is configured to select one of the second and third channels C2 and C3 for accessing the second shared resource 210. In one embodiment, the channel that has the highest channel priority level is selected. As the first channel priority level is higher than the second channel priority level, the third selection circuit 224 selects the second channel C2 (here, the selected channel corresponds to the second channel C2). Upon the selection of the second channel C2, the third selection circuit 224 is further configured to generate third select data. SL3 that is indicative of the selected second channel C2.

The second flow controller 226 is coupled with the second selection circuit 222 and the second storage circuit 211. The second flow controller 226 is configured to receive the second select data SL2 from the second selection circuit 222. Based on the second select data SL2, the second flow controller 226 is further configured to access the second storage circuit 211 to read the sixth and eighth flow data FW6 and FW8 associated with the selected sixth and eighth flows F6 and F8, respectively, and output the sixth and eighth flow data FW6 and FW8.

The channel controller 228 is coupled with the second selection circuit 222, the second flow controller 226, and the third storage circuit 213. The channel controller 228 is configured to receive the sixth and eighth flow data FW6 and FW8 from the second flow controller 226 and the third select data SL3 from the second selection circuit 222. Based on the third select data SL3, the channel controller 228 is further configured to output one of the sixth and eighth flow data FW6 and FW8 for granting one of the corresponding sixth and eighth flows F6 and F8 access to the second shared resource 210. As the third select data SL3 is indicative of the second channel C2, the channel controller 228 outputs the sixth flow data FW6. Based on the outputted sixth flow data FW6, the sixth flow F6 and the associated second channel C2 are granted access to the second shared resource 210.

The second DMA controller 206 is coupled with the second arbitration system 204 (i.e., the channel controller 228), and configured to receive the sixth flow data FW6. The second DMA controller 206 is further coupled with the source nodes associated with each of the fifth through tenth flows F5-F10, and further configured to receive the fifth through tenth flows F5-F10 by way of the second and third channels C2 and C3. Based on the received flow data, the second DMA controller 206 is configured to grant one of the fifth through tenth flows F5-F10 the access to the second shared resource 210. As received flow data is the sixth flow data FW6, the second DMA controller 206 grants the sixth flow F6 the access to the second shared resource 210.

The access to the second shared resource 210 is granted by way of the second interconnect 208 that is coupled between the second DMA controller 206 and the second shared resource 210. For example, the second interconnect 208 receives the sixth flow F6 from the second DMA controller 206, and provides the sixth flow F6 to the second shared resource 210, thereby granting the sixth flow F6 access to the second shared resource 210. The second shared resource 210 is thus accessed by way of the second channel C2, the second DMA controller 206, and the second interconnect 208. The access grant may correspond to an execution of an operation associated with the sixth flow F6. For example, when the second shared resource 210 corresponds to a memory, the second shared resource 210 is accessed to execute memory access operations (i.e., read and write operations).

Although in the presently preferred embodiment of the present disclosure the second shared resource 210 corresponds to a memory, it will be apparent to a person skilled in the art that the scope of the present disclosure is not limited to it. In various other embodiments, the second shared resource 210 may correspond to various other components of the SoC 100 (such as a data bus (not shown)), without deviating from the scope of the present disclosure. In such a scenario, flow data (such as the sixth flow data FW6) is outputted to a bus controller (not shown).

In operation, during a boot up of the SoC 100, the second system controller 202 generates and provides the second configuration data CF2 to the second arbitration system 204 (i.e., the second processing circuit 216). The second configuration data CF2 is indicative of the fifth through tenth flows F5-F10 and the fifth through tenth flow data FW5-F10 associated with the fifth through tenth flows F5-F10, respectively. The second configuration data CF2 is further indicative of the second and third channels C2 and C3, the first and second channel data CN1 and CN2 associated with second and third channels C2 and C3, respectively, and an arbitration algorithm associated with the fifth through tenth flows F5-F10 and the second and third channels C2 and C3. Further, the second storage circuit 211 is initialized to store therein the second priority table 212 that includes fifth through tenth flow data. FW5-FW10, and the third storage circuit 213 is initialized to store therein the third priority table 214 that includes the first and second channel data CN1 and CN2. In one embodiment, the initialization of the second and third storage circuits 211 and 213 during the boot up of the SoC 100 is executed by the second system controller 202. The second system controller 202 may additionally generate and provide, after the boot up and during an operation of the SoC 100, the second status data ST2 to the second arbitration system 204 (i.e., the second processing circuit 216). The second status data ST2 indicates whether any of the fifth through tenth flows F5-F10 are awaiting associated metadata, and hence are currently not arbitrating for access to the second shared resource 210.

Based on the second configuration data CF2 and the second status data ST2, the second processing circuit 216 identifies, from the second plurality of flows F5-F10, the second set of flows that are currently arbitrating for access to the second shared resource 210. The second set of flows include the first subset of flows (i.e., the sixth and seventh flows F6 and F7) and the second subset of flows (i.e., the eighth and ninth flows F8 and F9) that are associated with the second and third channels C2 and C3, respectively. The second processing circuit 216 then generates the second arbitration request ARB2 that is indicative of the identified first and second subsets of flows and the third arbitration request ARB3 that is indicative of the associated second and third channels C2 and C3. The second and third arbitration requests ARB2 and ARB3 are then provided to the second and third selection circuits 222 and 224, respectively.

The second selection circuit 222 accesses the second storage circuit 211 based on the second arbitration request ARB2 to identify the second set of flow priority levels (i.e., the sixth and seventh flow priority levels of the sixth and seventh flows F6 and F7, respectively) and the third set of flow priority levels (i.e., the eighth and ninth flow priority levels of the eighth and ninth flows F8 and F9, respectively). As the sixth flow priority level is higher than the seventh flow priority level and the eighth flow priority level is higher than the ninth flow priority level, the second selection circuit 222 selects the sixth and eighth flows F6 and F8 for accessing the second shared resource 210. The second selection circuit 222 then generates the second select data SL2 that is indicative of the selected sixth and eighth flows F6 and F8, and provides the second select data SL2 to the second flow controller 226. Based on the second select data SL2, the second flow controller 226 accesses the second storage circuit 211 to read the sixth and eighth flow data. FW6 and FW8 stored therein, and outputs and provides the sixth and eighth flow data FW6 and FW8 to the channel controller 228.

The third selection circuit 224 accesses the third storage circuit 213 based on the third arbitration request ARB3 to identify the first and second channel priority levels associated with the second and third channels C2 and C3. As the first channel priority level is higher than the second channel priority level, the third selection circuit 224 selects the second channel C2 for accessing the second shared resource 210, and generates the third select data SL3 that is indicative of the selected second channel C2. The second selection circuit 222 then provides the third select data SL3 to the channel controller 228. Based on the received third select data SL3, the channel controller 228 outputs and provides the sixth flow data FW6 to the second DMA controller 206. Based on the outputted sixth flow data FW6, the sixth flow F6 is granted access to the second shared resource 210.

When the sixth flow data FW6 is outputted (i.e., the sixth flow F6 is granted access to the second shared resource 210), the sixth flow weight count, the first channel weight count, and the sixth transfer count are decremented with each data transfer associated with the sixth flow F6. When the flow weight count of a flow is equal to the third threshold value, the second processing circuit 216 generates an update request for updating the second priority table 212 (i.e., the flow priority level of the corresponding flow in the second priority table 212). For example, when the sixth flow weight count is equal to the third threshold value, the second processing circuit 216 generates and provides the second update request U2 to the second priority table controller 218. The second update request U2 is indicative of exhaustion of the weight associated with the sixth flow F6. Based on the second update request U2, the second priority table controller 218 accesses the second storage circuit 211 to update the second priority table 212 such that the sixth flow priority level of the sixth flow F6 is updated from the fourth value to the fifth value, and the seventh flow priority level of the seventh flow F7 (i.e., the flow that is immediately below the sixth flow F6 in the second priority table 212) is updated from the sixth value to the fourth value. The sixth flow data FW6 and the sixth flow F6 thus have the lowest flow priority level. Further, the sixth flow weight count may be reset to the eighth predetermined value after the generation of the second update request U2. It will be apparent to a person skilled in the art that for each subsequent arbitration request that is generated, one of the fifth through tenth flow data FW5-FW10 is outputted (i.e., one of the fifth through tenth flows F5-F10 is granted access to the second shared resource 210) in a similar manner as described above. With each access grant, the transfer count of the corresponding flow and the channel weight count of the corresponding channel is further decremented.

When the channel weight count of a channel is equal to the fourth threshold value, the second processing circuit 216 generates an update request for updating the third priority table 214 (i.e., the channel priority level of the corresponding channel in the third priority table 214). For example, when the first channel weight count is equal to the fourth threshold value, the second processing circuit 216 generates and provides the third update request U3 to the third priority table controller 220. The third update request U3 is indicative of exhaustion of the weight associated with the second channel C2. Based on the third update request U3, the third priority table controller 220 accesses the third storage circuit 213 to update the third priority table 214 such that the first and second channel priority levels are swapped. In other words, the first channel priority level is updated from a seventh value to an eighth value, and the second channel priority level associated with the third channel C3 that is immediately below the second channel C2 in the third priority table 214 is updated from a ninth value to the seventh value. As the third priority table 214 stores two channel data, the eighth value and the ninth value are same. Further, the first channel weight count may be reset to the thirteenth predetermined value after the generation of the third update request U3.

When the transfer count of a flow is equal to the fifth threshold value, the second processing circuit 216 generates a delete request for deleting the corresponding flow (i.e., the corresponding flow data) from the second priority table 212. For example, when the sixth transfer count is equal to the fifth threshold value, the second processing circuit 216 generates and provides the second delete request D2 to the second priority table controller 218. The second delete request D2 is indicative of the exhaustion of the total transfer size of the sixth flow F6. Based on the second delete request D2, the second priority table controller 218 accesses the second storage circuit 211 to delete the sixth flow data FW6 stored therein. In such a scenario, the flow priority levels of the flow data placed below the sixth flow data FW6 are incremented by one. It will be apparent to a person skilled in the art that the fifth through seventh, ninth and tenth flow data FW5-FW7, FW9, and FW10 are deleted from the second priority table 212 in a similar manner as described above (i.e., when the corresponding transfer counts are equal to the fifth threshold value).

The present disclosure further facilitates addition of new flow data to the second priority table 212 when the corresponding flow is arbitrating for access to the second shared resource 210. For example, when the eleventh flow is arbitrating for access to the second shared resource 210, the second system controller 202 generates and provides the associated eleventh flow data FW11 to the second arbitration system 204 (i.e., the second processing circuit 216) for adding to the second priority table 212. The second processing circuit 216 then generates the second add request ADD2 indicative of the eleventh flow data FW11, and provides the second add request ADD2 to the second priority table controller 218. Based on the second add request ADD2, the second priority table controller 218 accesses the second storage circuit 211 to add the eleventh flow data FW11 thereto. The eleventh flow data FW11 is added such that the eleventh flow priority level is one less than the lowest flow priority level of the fifth through tenth flow priority levels. The eleventh flow data FW11 may be associated with one of the second and third channels C2 and C3. Upon the addition of the eleventh flow data FW11 to the second priority table 212, a total of seven flows arbitrate for access to the second shared resource 210, and the operations executed by the second arbitration system 204 in such a scenario are similar to the operations executed for arbitrating between the fifth through tenth flows F5-F10 as described above.

Although FIG. 2 illustrates that six flows (i.e., the fifth through tenth flows F5-F10) are arbitrating for access to the second shared resource 210, the scope of the present disclosure is not limited to it. In various other embodiments, more than or less than six flows associated with any of the second or third channels C2 or C3 may be arbitrating for access to the first shared resource 110, without deviating from the scope of the present disclosure.

It will be apparent to a person skilled in the art that the scope of the present disclosure is not limited to the second DMA controller 206 being coupled with two channels (i.e., the second and third channels C2 and C3). In various other embodiments, the second DMA controller 206 may be coupled with more than two channels with multiple flows arbitrating for access on each channel, without deviating from the scope of the present disclosure. The arbitration executed by the second arbitration system 204, in such a scenario, is similar to the arbitration described above.

Thus, the arbitration system (such as the first and second arbitration systems 104 and 204) of the present disclosure deletes flows, i.e., flow data (such as the first flow data FW1 and the sixth flow data FW6) from the priority table (such as the first and second priority tables 112 and 212), when the corresponding total data transfer size is exhausted. The deletion of such a flow improves a quality of service of the arbitration system as latencies in data transfer or memory access operations are avoided. Thus, the quality of service of the arbitration system of the present disclosure is significantly higher than that of a conventional arbitration system. Further, new flow data (such as the fourth and eleventh flow data FW4 and FW11) is added to the priority table such that a flow priority level (such as the fourth and eleventh flow priority levels) of the new flow data is one less than the lowest priority flow in the priority table. This ensures that the priority levels of the flows currently present in the priority table are unaffected by the addition of the new flow, thereby further improving the quality of service.

When a highest priority flow (such as the fifth flow F5) is awaiting metadata, the corresponding flow is considered not to be arbitrating for access to the shared resource (such as the first and second shared resources 110 and 210). Instead, a flow having a lower priority level (such as the sixth flow F6) than the highest priority flow may be granted access to the shared resource. As a result, a performance (i.e., an efficiency) of the arbitration system and a utilization of the shared resource is significantly higher than that of the conventional arbitration system and the corresponding shared resource, respectively. Further, the arbitration system of the present disclosure includes one storage circuit (i.e., one priority table) for storing flow data and one storage circuit (i.e., one priority table) for storing channel data. Hence, when flows associated with multiple channels are arbitrating for access to the shared resource, an area occupied by the arbitration system of the present disclosure on the SoC 100 is significantly less than that of the conventional arbitration system. Further, as a number of channels increase, the number of storage circuits (i.e., priority tables) included in the arbitration system remains unchanged at two. Thus, the scalability of the arbitration system of the present disclosure is less complex than that of the conventional arbitration system.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

The invention claimed is:

1. An arbitration system for arbitrating between a plurality of flows for access to a shared resource, the arbitration system comprising:
   a storage circuit that is configured to store a priority table that includes a plurality of flow data associated with the plurality of flows, respectively, such that each flow data and the corresponding flow have a flow priority level associated therewith;
   a processing circuit that is configured to identify, from the plurality of flows, a set of flows that are arbitrating for access to the shared resource;
   a selection circuit that is coupled with the processing circuit and the storage circuit, and configured to select a first flow from the set of flows for accessing the shared resource based on a set of flow priority levels associated with the set of flows, respectively; and
   a flow controller that is coupled with the storage circuit and the selection circuit, and configured to access the storage circuit to read first flow data associated with the selected first flow, and output the first flow data for granting the first flow access to the shared resource.

2. The arbitration system of claim 1, wherein:
   the processing circuit is further configured to generate, upon identification of the set of flows, an arbitration request indicative of the set of flows,
   the selection circuit is further configured to: (i) receive the arbitration request, (ii) access the storage circuit based on the arbitration request to identify, for selecting the first flow, the set of flow priority levels associated with the set of flows, respectively, and (iii) generate select data that is indicative of the selected first flow,
   the flow controller is further configured to receive the select data, and
   the flow controller accesses the storage circuit to read the first flow data based on the select data.

3. The arbitration system of claim 2, wherein the processing circuit is further configured to receive configuration data and status data, wherein the configuration data is indicative of the plurality of flows, the plurality of flow data, and an arbitration algorithm associated with the plurality of flows, and the status data is indicative of a current arbitration status of each flow of the plurality of flows, and wherein the set of flows is identified and the arbitration request is generated by the processing circuit based on the configuration data and the status data.

4. The arbitration system of claim 1, wherein the processing circuit is further configured to:
   receive configuration data that is indicative of the plurality of flows, the plurality of flow data, and an arbitration algorithm associated with the plurality of flows, wherein each flow data of the plurality of flow data includes an identifier of a corresponding flow of the plurality of flows;
   generate, based on the configuration data, a plurality of flow weight counts associated with the plurality of flows, respectively, such that a first flow weight count of the plurality of flow weight counts is indicative of a weight of the first flow; and
   generate, based on the configuration data, a plurality of transfer counts associated with the plurality of flows, respectively, such that a first transfer count of the plurality of transfer counts is indicative of a total transfer size of the first flow, wherein when the first flow data is outputted, the first flow weight count and the first transfer count are decremented.

5. The arbitration system of claim 4, further comprising a priority table controller that is coupled with the processing circuit and the storage circuit, and configured to:
   receive, from the processing circuit, an update request for updating the priority table, wherein the processing circuit is further configured to generate the update request when the first flow weight count is equal to a first threshold value; and
   access, based on the update request, the storage circuit to update the priority table such that a flow priority level of the first flow is updated from a first value to a second value, and a flow priority level of a flow that is immediately below the first flow in the priority table is updated from a third value to the first value, wherein the first value corresponds to a highest flow priority level of the set of flow priority levels, respectively, and the second value corresponds to a lowest flow priority level of a plurality of flow priority levels that are associated with the plurality of flows, respectively.

6. The arbitration system of claim 4, further comprising a priority table controller that is coupled with the processing circuit and the storage circuit, and configured to:
   receive, from the processing circuit, a delete request for deleting the first flow data from the priority table, wherein the processing circuit is further configured to generate the delete request when the first transfer count is equal to a second threshold value; and
   access, based on the delete request, the storage circuit to delete the first flow data from the priority table.

7. The arbitration system of claim 1, wherein the processing circuit is further configured to receive, for adding to the priority table, second flow data associated with a second flow, and generate an add request to add the second flow data to the priority table, and wherein the add request includes the second flow data.

8. The arbitration system of claim 7, further comprising a priority table controller that is coupled with the processing circuit and the storage circuit, and configured to receive the add request, and access the storage circuit to add the second flow data to the priority table, wherein the second flow data is added to the priority table such that a flow priority level of the second flow data is one less than a lowest flow priority level of a plurality of flow priority levels that are associated with the plurality of flows, respectively.

9. An arbitration system for arbitrating between a plurality of flows for access to a shared resource, wherein the plurality of flows are associated with a plurality of channels, the arbitration system comprising:
   first and second storage circuits that are configured to store first and second priority tables that include a plurality of flow data associated with the plurality of flows and a plurality of channel data associated with the plurality of channels, respectively;
   a processing circuit that is configured to identify, from the plurality of flows, a set of flows that are arbitrating for access to the shared resource, wherein the set of flows includes first and second subsets of flows associated with first and second channels of the plurality of channels, respectively;
   first and second selection circuits, wherein the first selection circuit is coupled with the first storage circuit and the processing circuit, and configured to select, for accessing the shared resource, first and second flows from the first and second subsets of flows, respectively, and the second selection circuit is coupled with the second storage circuit and the processing circuit, and configured to select, for accessing the shared resource, one of the first and second channels;

a flow controller that is coupled with the first selection circuit and the first storage circuit, and configured to access the first storage circuit to read first and second flow data associated with the selected first and second flows, respectively, and output the first and second flow data; and a channel controller that is coupled with the flow controller and the second selection circuit, and configured to receive the first and second flow data, and output, based on the selected channel, one of the first and second flow data for granting one of the corresponding first and second flows access to the shared resource.

10. The arbitration system of claim 9, wherein:

the first selection circuit is further configured to generate first select data that is indicative of the selected first and second flows, and the second selection circuit is further configured to generate second select data that is indicative of the selected channel, the flow controller and the channel controller are further configured to receive the first and second select data, respectively, and the flow controller accesses the first storage circuit to read the first and second flow data based on the first select data, and the channel controller outputs one of the first and second flow data based on the second select data.

11. The arbitration system of claim 9, wherein:

the first priority table includes the plurality of flow data such that each flow data and the corresponding flow have a flow priority level associated therewith, the second priority table includes the plurality of channel data such that each channel data and the corresponding channel have a channel priority level associated therewith, each flow data of the plurality of flow data includes an identifier of a corresponding flow of the plurality of flows and an identifier of one of the plurality of channels associated with the corresponding flow, and each channel data of the plurality of channel data includes an identifier of a corresponding channel of the plurality of channels.

12. The arbitration system of claim 11, wherein:

the processing circuit is further configured to generate, upon identification of the set of flows, a first arbitration request that is indicative of the first and second subsets of flows and a second arbitration request that is indicative of the first and second channels, the first selection circuit is further configured to receive the first arbitration request, and access the first storage circuit based on the first arbitration request to identify, for selecting the first and second flows, first and second sets of flow priority levels that are associated with the first and second subsets of flows, respectively, and the second selection circuit is further configured to receive the second arbitration request, and access the second storage circuit based on the second arbitration request to identify, for selecting one of the first and second channels, first and second channel priority levels that are associated with the first and second channels, respectively.

13. The arbitration system of claim 12, wherein the processing circuit is further configured to receive configuration data and status data, wherein the configuration data is indicative of the plurality of flows, the plurality of flow data, the plurality of channels, the plurality of channel data, and an arbitration algorithm associated with the plurality of flows and the plurality of channels, and the status data is indicative of a current arbitration status of each flow of the plurality of flows, and wherein the first and second subsets of flows are identified and the first and second arbitration requests are generated by the processing circuit based on the configuration data and the status data.

14. The arbitration system of claim 12, wherein the processing circuit is further configured to:

receive configuration data that is indicative of the plurality of flows, the plurality of flow data, the plurality of channels, the plurality of channel data, and an arbitration algorithm associated with the plurality of flows and the plurality of channels;

generate, based on the configuration data, a plurality of flow weight counts associated with the plurality of flows, respectively, such that a first flow weight count of the plurality of flow weight counts is indicative of a weight of the first flow;

generate, based on the configuration data, a plurality of transfer counts associated with the plurality of flows, respectively, such that a first transfer count of the plurality of transfer counts is indicative of a total transfer size of the first flow; and generate, based on the configuration data, a plurality of channel weight counts associated with the plurality of channels, respectively, such that a first channel weight count of the plurality of channel weight counts is indicative of a weight of the first channel, wherein when the first flow data is outputted, the first flow weight count, the first transfer count, and the first channel weight count are decremented.

15. The arbitration system of claim 14, further comprising a first priority table controller that is coupled with the processing circuit and the first storage circuit, and configured to:

receive, from the processing circuit, a first update request for updating the first priority table, wherein the processing circuit is further configured to generate the first update request when the first flow weight count is equal to a first threshold value; and access, based on the first update request, the first storage circuit to update the first priority table such that a flow priority level of the first flow is updated from a first value to a second value, and a flow priority level of a flow that is immediately below the first flow in the first priority table is updated from a third value to the first value, wherein the first value corresponds to a highest flow priority level of one of the first and second sets of flow priority levels, and the second value corresponds to a lowest flow priority level of a plurality of flow priority levels that are associated with the plurality of flows, respectively.

16. The arbitration system of claim 14, further comprising a first priority table controller that is coupled with the processing circuit and the first storage circuit, and configured to:

receive, from the processing circuit, a delete request for deleting the first flow data from the first priority table, wherein the processing circuit is further configured to generate the delete request when the first transfer count is equal to a second threshold value; and access, based on the delete request, the first storage circuit to delete the first flow data from the first priority table.

17. The arbitration system of claim 14, further comprising a second priority table controller that is coupled with the processing circuit and the second storage circuit, and configured to:

receive, from the processing circuit, a second update request for updating the second priority table, wherein the processing circuit is further configured to generate the second update request when the first channel weight count is equal to a third threshold value; and access, based on the second update request, the second storage circuit to update the second priority table such that a channel priority level of the first channel is updated from a fourth value to a fifth value, and a channel priority level of a channel that is immediately below the first channel in the second priority table is updated from a sixth value to the fourth value, wherein the fourth value corresponds to a highest channel priority level of the first and second channel priority levels, and the fifth value corresponds to a lowest channel priority level of a plurality of channel priority levels that are associated with the plurality of channels, respectively.

18. The arbitration system of claim 9, wherein the processing circuit is further configured to receive, for adding to the first priority table, third flow data associated with a third flow, and generate an add request to add the third flow data to the first priority table, and wherein the add request includes the third flow data.

19. The arbitration system of claim 18, further comprising a first priority table controller that is coupled with the processing circuit and the first storage circuit, and configured to receive the add request, and access the first storage circuit to add the third flow data to the first priority table, wherein the third flow data is added to the first priority table such that a flow priority level of the third flow data is one less than a lowest flow priority level of a plurality of flow priority levels that are associated with the plurality of flows, respectively.

20. A system-on-chip, comprising,
a shared resource;
an arbitration system that is configured to arbitrate between a plurality of flows for access to the shared resource, wherein the plurality of flows are associated with a plurality of channels, the arbitration system comprising:

first and second storage circuits configured to store first and second priority tables that include a plurality of flow data associated with the plurality of flows and a plurality of channel data associated with the plurality of channels, respectively;

a processing circuit that is configured to identify, from the plurality of flows, a set of flows that are arbitrating for access to the shared resource, wherein the set of flows includes first and second subsets of flows associated with first and second channels of the plurality of channels, respectively;

first and second selection circuits, wherein the first selection circuit is coupled with the first storage circuit and the processing circuit, and configured to select, for accessing the shared resource, first and second flows from the first and second subsets of flows, respectively, and the second selection circuit is coupled with the second storage circuit and the processing circuit, and configured to select, for accessing the shared resource, one of the first and second channels;

a flow controller that is coupled with the first selection circuit and the first storage circuit, and configured to access the first storage circuit to read first and second flow data associated with the selected first and second flows, respectively, and output the first and second flow data; and a channel controller that is coupled with the flow controller and the second selection circuit, and configured to receive the first and second flow data, and output, based on the selected channel, one of the first and second flow data; and a direct memory access controller that is coupled with the channel controller, and configured to receive one of the first and second flow data, and grant, based on the received flow data, one of the first and second flows the access to the shared resource.

* * * * *